(12) United States Patent
Edwards

(10) Patent No.: US 10,941,002 B2
(45) Date of Patent: Mar. 9, 2021

(54) TELESCOPIC CONVEYOR WITH CURVED SECTIONS

(71) Applicant: Telestack Limited, Omagh (GB)

(72) Inventor: Philip Edwards, Omagh (GB)

(73) Assignee: Telestack Limited, Omagh (GB)

( * ) Notice: Subject to any disclaimer, the term of this patent is extended or adjusted under 35 U.S.C. 154(b) by 0 days.

(21) Appl. No.: 16/625,914

(22) PCT Filed: Jun. 14, 2018

(86) PCT No.: PCT/EP2018/065778
§ 371 (c)(1),
(2) Date: Dec. 23, 2019

(87) PCT Pub. No.: WO2018/234143
PCT Pub. Date: Dec. 27, 2018

(65) Prior Publication Data
US 2020/0148477 A1  May 14, 2020

(30) Foreign Application Priority Data

Jun. 22, 2017 (GB) ..................................... 1710001

(51) Int. Cl.
*B65G 15/02* (2006.01)
*B65G 15/12* (2006.01)
(Continued)

(52) U.S. Cl.
CPC ............. *B65G 15/02* (2013.01); *B65G 15/12* (2013.01); *B65G 15/26* (2013.01); *B65G 21/14* (2013.01); *B65G 41/008* (2013.01); *B65G 63/027* (2013.01); *B65G 67/606* (2013.01); *B65G 2201/04* (2013.01); *B65G 2812/02217* (2013.01); *B65G 2814/0397* (2013.01)

(58) Field of Classification Search
CPC ........ B65G 15/02; B65G 15/12; B65G 15/26; B65G 67/606
USPC ......... 198/313, 536, 568, 812, 861.2; 193/6; 414/728
See application file for complete search history.

(56) References Cited

U.S. PATENT DOCUMENTS 3,841,463 A * 10/1974 Stone ..................... B65G 21/14
198/861.2
4,523,669 A    6/1985 Smith
(Continued)

FOREIGN PATENT DOCUMENTS

DE        556025    8/1932
DE       1145540    3/1963
(Continued)

OTHER PUBLICATIONS

International Search Report and Written Opinion of the ISA from corresponding PCT Application No. PCT/EP2018/065778, dated Sep. 26, 2018.
(Continued)

*Primary Examiner* — Joseph A Dillon, Jr.
(74) *Attorney, Agent, or Firm* — Gardner Linn

(57) ABSTRACT

A telescopic conveyor includes a conveyor boom having two or more conveyor sections adapted to be extended and retracted with respect to one another in telescopic fashion to adjust the length of the boom, wherein the two or more conveyor sections are each curved about a common axis of curvature.

14 Claims, 2 Drawing Sheets

(51) Int. Cl.
  *B65G 15/26* (2006.01)
  *B65G 21/14* (2006.01)
  *B65G 41/00* (2006.01)
  *B65G 63/02* (2006.01)
  *B65G 67/60* (2006.01)

(56) References Cited

U.S. PATENT DOCUMENTS

| | | | |
|---|---|---|---|
| 4,624,357 A | 11/1986 | Oury et al. | |
| 5,203,442 A | 4/1993 | Oury et al. | |
| 5,490,592 A * | 2/1996 | Best | B65G 13/12 |
| | | | 198/812 |
| 5,498,119 A * | 3/1996 | Faivre | B60P 1/36 |
| | | | 198/313 |
| 6,481,566 B1 * | 11/2002 | Horak | B65G 21/08 |
| | | | 198/595 |
| 6,896,123 B1 * | 5/2005 | Horak | B65G 21/08 |
| | | | 198/595 |
| 7,108,125 B2 * | 9/2006 | Gilmore | A61K 9/0019 |
| | | | 198/313 |
| 8,241,098 B1 * | 8/2012 | Latimer | A01F 12/46 |
| | | | 198/313 |
| 9,511,943 B2 * | 12/2016 | Mast | B65G 21/10 |
| 10,435,246 B2 * | 10/2019 | Baek | B65G 21/2072 |
| 10,538,391 B2 * | 1/2020 | Bratton | B65G 21/14 |
| 2002/0187022 A1 | 12/2002 | Horak | |
| 2004/0112719 A1 * | 6/2004 | Gilmore | B65G 21/14 |
| | | | 198/812 |
| 2009/0057106 A1 * | 3/2009 | Trieb | B65G 21/04 |
| | | | 198/845 |

FOREIGN PATENT DOCUMENTS

| | | |
|---|---|---|
| FR | 670938 | 12/1929 |
| GB | 2175562 | 12/1986 |
| GB | 25362803 | 5/2020 |

OTHER PUBLICATIONS

UK Search Report of corresponding Application No. GB1710001.7, dated Dec. 20, 2017.

* cited by examiner

TELESCOPIC CONVEYOR WITH CURVED SECTIONS

CROSS REFERENCE TO RELATED APPLICATIONS

The present application is a § 371 national stage of International Application PCT/EP2018/065778, filed Jun. 14, 2018, which claims priority benefit of U.K. Pat. Application Ser. No. 1710001.7, filed Jun. 22, 2017, both of which are hereby incorporated herein by reference in their entireties.

FIELD OF THE INVENTION

This invention relates to telescopic conveyor and in particular to an improved telescopic conveyor for loading bulk material onto ships.

BACKGROUND OF THE INVENTION

Ship loading conveyors are used for loading bulk solid materials, such as iron ore, coal, fertilizers, grains or other particulate material onto ships.

A ship loading conveyor typically comprises a telescopically extendable boom upon which is supported a belt conveyor and a mobile support structure to support the boom. The mobile support structure is usually mounted on rails and/or incorporates wheels and/or tracks so that it can move in order to be able to reach the whole length of a vessel moored alongside the conveyor. Typically the boom also can be extended and retracted and/or moved up and down so that the conveyor can fill the whole breadth of the hold of the vessel and adapt to its increasing draught during loading. A telescoping chute is typically mounted at a distal end of the boom to facilitate even and complete filling of the vessel's hold.

The height of a typical ship loading conveyor can be in excess of 20 metres and the boom can extend to a length of more than 60 metres. A problem with known telescopically extendable ship loading conveyors is that the height of the distal end of the boom increases as the boom is extended. Therefore, at full extension, the height of the distal end of the boom can become excessive, requiring a very long chute. Ideally the boom should extend in a substantially horizontal plane so that the height of the distal end of the boom remains constant as it is extended and retracted, allowing the use of a chute of constant length and avoiding excessive boom height.

Attempts have been made to produce booms having a first section inclined at a relatively steep angle and a second section, extending from the first section at a shallower angle. However, in such arrangements the telescopic extension of the boom is limited by the length of the second section of the boom, which may be a fraction of the overall length of the boom, greatly reducing the range over which the boom can be extended and retracted.

SUMMARY OF THE INVENTION

According to an aspect of the present invention there is provided a telescopic conveyor comprising a conveyor boom comprising two or more conveyor sections adapted to be extended and retracted with respect to one another in telescopic fashion to adjust the length of the boom, wherein the two or more conveyor sections are each curved about a common axis of curvature. Optionally, each conveyor section comprises a substantially rigid elongate body.

In one embodiment the conveyor boom comprises a first conveyor section and a second conveyor section, the second conveyor section being telescopically mounted within the first conveyor section, the first and second conveyor sections being curved about a common axis of curvature. Optionally, the second section extends from the first section in cantilevered manner. Optionally, the second section is supported by the first section in cantilevered manner.

A support structure may be provided upon which the conveyor boom is mounted. The support structure may be adapted to adjust the inclination of the conveyor boom. In one embodiment the conveyor boom may be pivotally mounted on the support structure at one end and is linked to the support structure via one or more hydraulic rams to allow the inclination of the boom to be adjusted. The support structure may be mounted on tracks and/or wheels to enable the support frame to be moved.

Optionally, a movable conveying surface is mounted on the conveyor boom extending between a loading end and a discharge end of the conveyor boom, the discharge end being provided at a distal end of an outermost section of the conveyor boom. In one embodiment the movable conveying surface may comprise a belt conveyor. The belt conveyor may be mounted on the conveyor boom to provide a conveying surface along an upper region of the conveyor boom.

The two or more conveyor sections of the conveyor boom may have a generally rectangular cross-section. The cross-section of the second/distal section of the conveyor boom may be smaller than the cross-section of the first/proximal section so that the second section can be received within the first section.

Each of the two or more sections of the conveyor boom may comprise a hollow lattice of frame members and interconnecting bracing members. The frame members of each of the two or more sections may comprise upper and lower stringers, the upper and lower stringers of each of the two or more sections of the conveyor boom having a common axis of curvature.

These and other objects, advantages and features of the invention will become apparent upon review of the following specification in conjunction with the drawings.

BRIEF DESCRIPTION OF THE DRAWINGS

A telescopic conveyor in accordance with an embodiment of the present invention will now be described, by way of example only, with reference to the accompanying drawings, in which.

DETAILED DESCRIPTION OF THE DRAWINGS

Figure 1:
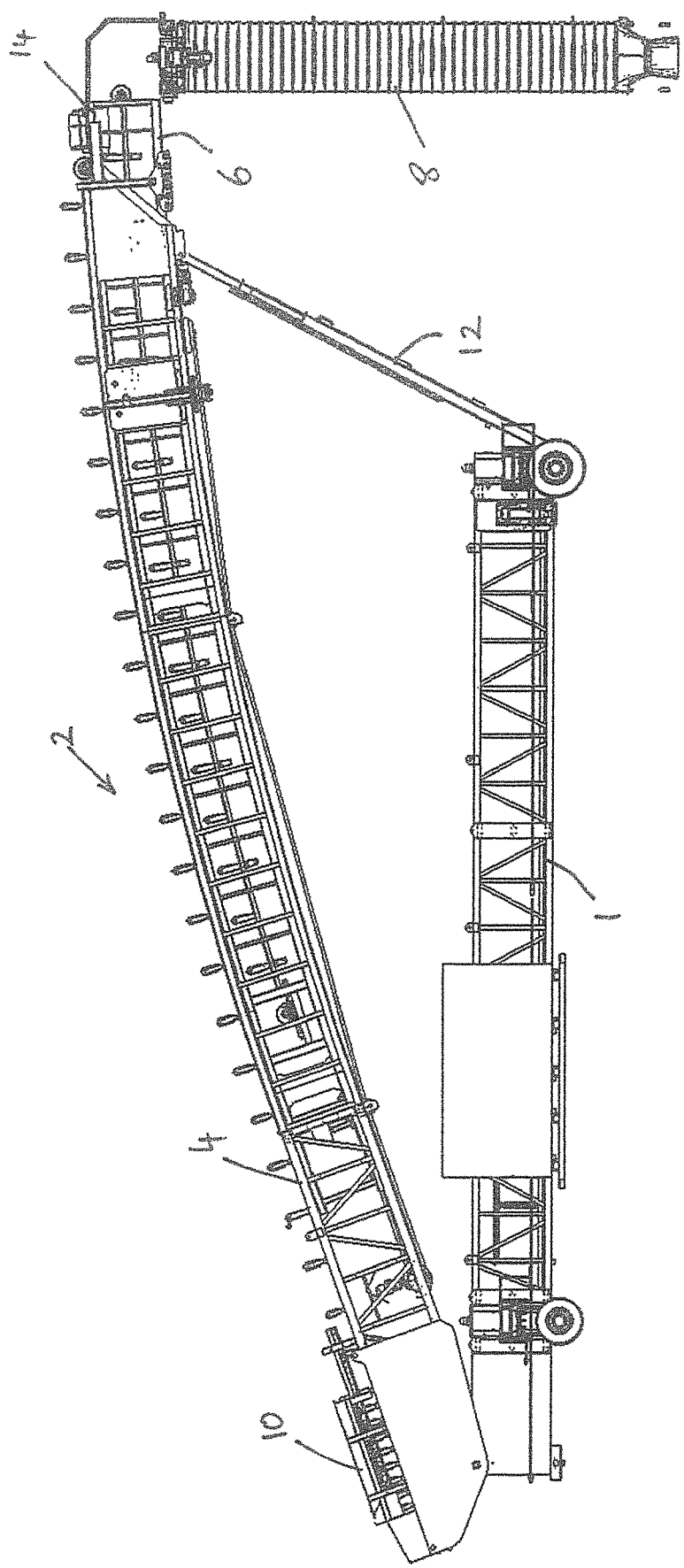
FIG. 1 is a side view of a telescopic conveyor in accordance with the present invention in its fully retracted configuration.
Figure 2:
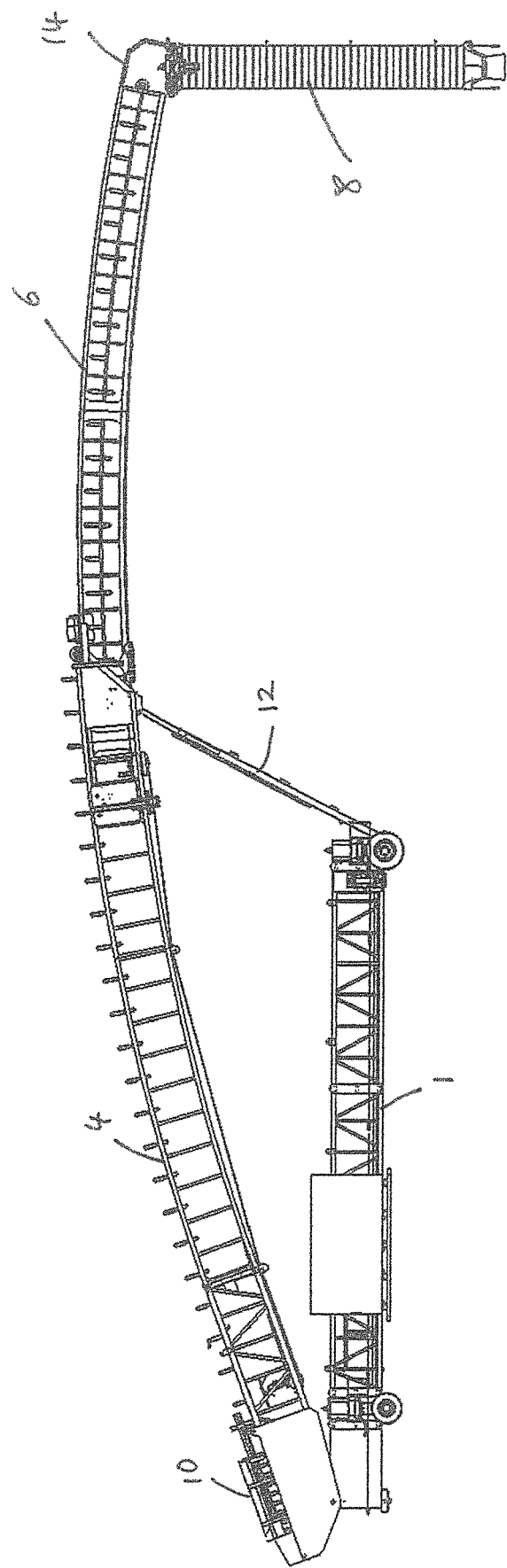
FIG. 2 is a side view of the telescopic conveyor of FIG. 1 in its full extended configuration.

A telescopic conveyor system according to an embodiment of the present invention is shown in FIGS. 1 and 2. The telescopic conveyor includes an elongate support frame 1 upon which is mounted a curved conveyor boom 2 having, the conveyor boom 2 including a first section 4 supported on the support frame 1 and a coaxially mounted second section 6, the second section 6 being telescopically mounted within the first section 4 to be reciprocally movable with respect to the first section 4 between a retracted position (shown in FIG. 1), when the second section is substantially located within the first section, and an extended position (shown in FIG. 2), wherein the second section 6 extends in cantilevered manner from the first section 4, wherein the first and second sections of the conveyor boom have a common axis of curvature to allow the second section 6 to be telescopically extended and retracted into and out of the first section 4, thereby allowing the outermost end of the outer section 6 of the conveyor boom 2 to follow an arc, reducing the overall height of the outermost end of the second section 6 of the conveyor boom 2 when it is fully extended configuration.

The first and second sections 4,6 of the conveyor boom 2 have a generally rectangular cross-section, with the cross-section of the second section 6 being smaller than the cross-section of the first section 4 so that the second section 6 can be received within the first section 4.

The first and second sections 4,6 of the conveyor boom 2 may each comprise a hollow lattice of frame members and interconnecting bracing members, to provide a light but strong rigid load supporting structure. The frame members of each of the first and second sections may include upper and lower stringers, the upper and lower stringers of each of the first and second sections 4,6 of the conveyor boom 2 having a common axis of curvature.

A conveyor belt (not shown) is mounted on the first and second sections 4,6 of the conveyor boom 2 to provide a conveying surface along an upper region of the conveyor boom 2.

An actuator or actuating means is provided for extending and retracting the second section 6 of the conveyor boom 2 with respect to the first section 4.

The actuator or actuating means may comprise a winch system with one or more cables guided around pulleys mounted on the first and second sections of the conveyor boom and associated with one or more rams or winch pulleys to facilitate extension and retraction of the second section of the conveyor boom with respect to the first section.

Alternatively a gearing system or chain and sprocket arrangement may be used to extend and retract the second section of the conveyor boom with respect to the first section. In another embodiment motor driven wheels or gears may be mounted on one section, preferably on the first section, engaging the second section to extend and retract the second section with respect to the first section.

As shown in the drawings, a loading chute 8 may be provided at a distal end (discharge end 14) of the conveyor boom 2. The chute 8 may be adjustable in length. The chute 8 may also incorporate means for lifting material to allow the conveyor to be used for unloading material from a ship.

The support frame 1 is preferably mounted on wheels and/or tracks to allow the support frame to be moved. The wheels and/or tracks may be driven, for example by means of hydraulic and/or electric motors. The wheels and/or tracks may be braked and/or may be lockable to selectively prevent rotation thereof. The wheels and/or tracks may be adapted to allow the support frame 1, and thus the conveyor boom 2, to move transverse to the longitudinal axis of the conveyor boom 2 to facilitate loading of a ship and/or may be configured or be configurable to allow the support frame 1, and thus the conveyor boom 2, to be moved in a direction aligned with the longitudinal axis of the conveyor boom. In one embodiment support frame 1 may be adapted to be mounted on rails.

Optionally, a lower end of the conveyor boom 2 is mounted on the support frame to define a loading end 10 of the conveyor and a support structure 12 extends between the support frame 1 and the conveyor boom 2 to support the conveyor boom 2 in an upwardly inclined orientation. The support structure 12 may be extendable and retractable to vary the height and/or inclination of the conveyor boom 2. Optionally, the support structure 12 includes at least one telescopic or extendable support member, such as in the form of one or more hydraulic rams, the at least one telescopic or extendable support member being extendable and retractable to adjust the angle of inclination of the conveyor boom 2 to adjust the height of the discharge end 14 of the conveyor boom 2.

The invention is not limited to the embodiment(s) described herein but can be amended or modified without departing from the scope of the present invention, which is intended to be limited only the scope of the appended claims as interpreted according to the principles of patent law including the doctrine of equivalents.

The invention claimed is:

1. A telescopic conveyor comprising a conveyor boom comprising two or more conveyor sections adapted to be extended and retracted with respect to one another in telescopic fashion to adjust the length of said boom, wherein said two or more conveyor sections are each curved about a common axis of curvature.

2. The telescopic conveyor of claim 1, wherein said conveyor boom comprises a first conveyor section and a second conveyor section, said second conveyor section being telescopically mounted within said first conveyor section, said first and second conveyor sections being curved about the common axis of curvature.

3. The telescopic conveyor of claim 2, wherein said second section extends from and is supported by said first section in cantilevered manner.

4. The telescopic conveyor of claim 1, comprising a support structure upon which said conveyor boom is mounted.

5. The telescopic conveyor of claim 4, wherein said support structure is adapted to adjust the inclination of said conveyor boom.

6. The telescopic conveyor of claim 5, wherein said conveyor boom is pivotally mounted on said support structure at one end and is linked to said support structure via one or more hydraulic rams to allow the inclination of said conveyor boom to be adjusted.

7. The telescopic conveyor of claim 4, wherein said support structure is mounted on tracks and/or wheels to enable said support frame to be moved.

8. The telescopic conveyor of claim 1, wherein a moveable conveying surface is mounted on said conveyor boom extending between a loading end and a discharge end of said conveyor boom, said discharge end being provided at a distal end of an outermost section of said conveyor boom.

9. The telescopic conveyor of claim 8, wherein said moveable conveying surface comprises a belt conveyor.

10. The telescopic conveyor of claim 9, wherein said belt conveyor is mounted on said conveyor boom to provide a conveying surface along an upper region of said conveyor boom.

11. The telescopic conveyor of claim 1, wherein said two or more conveyor sections of said conveyor boom have a generally rectangular cross-section.

12. The telescopic conveyor of claim 11, wherein said conveyor boom comprises a first conveyor section and a second conveyor section, said second conveyor section being telescopically mounted within said first conveyor section, said first and second conveyor sections being curved about the common axis of curvature, wherein the cross-section of said second section is smaller than the cross-section of said first section so that said second section can be received within said first section.

13. The telescopic conveyor of claim 12, wherein each of said two or more sections of said conveyor boom comprise a hollow lattice of frame members and interconnecting bracing members.

14. The telescopic conveyor of claim 13, wherein said frame members of each of said two or more sections comprise upper and lower stringers, said upper and lower stringers of each of said two or more sections of said conveyor boom having a common axis of curvature.

* * * * *